United States Patent Office 3,524,270
Patented Aug. 18, 1970

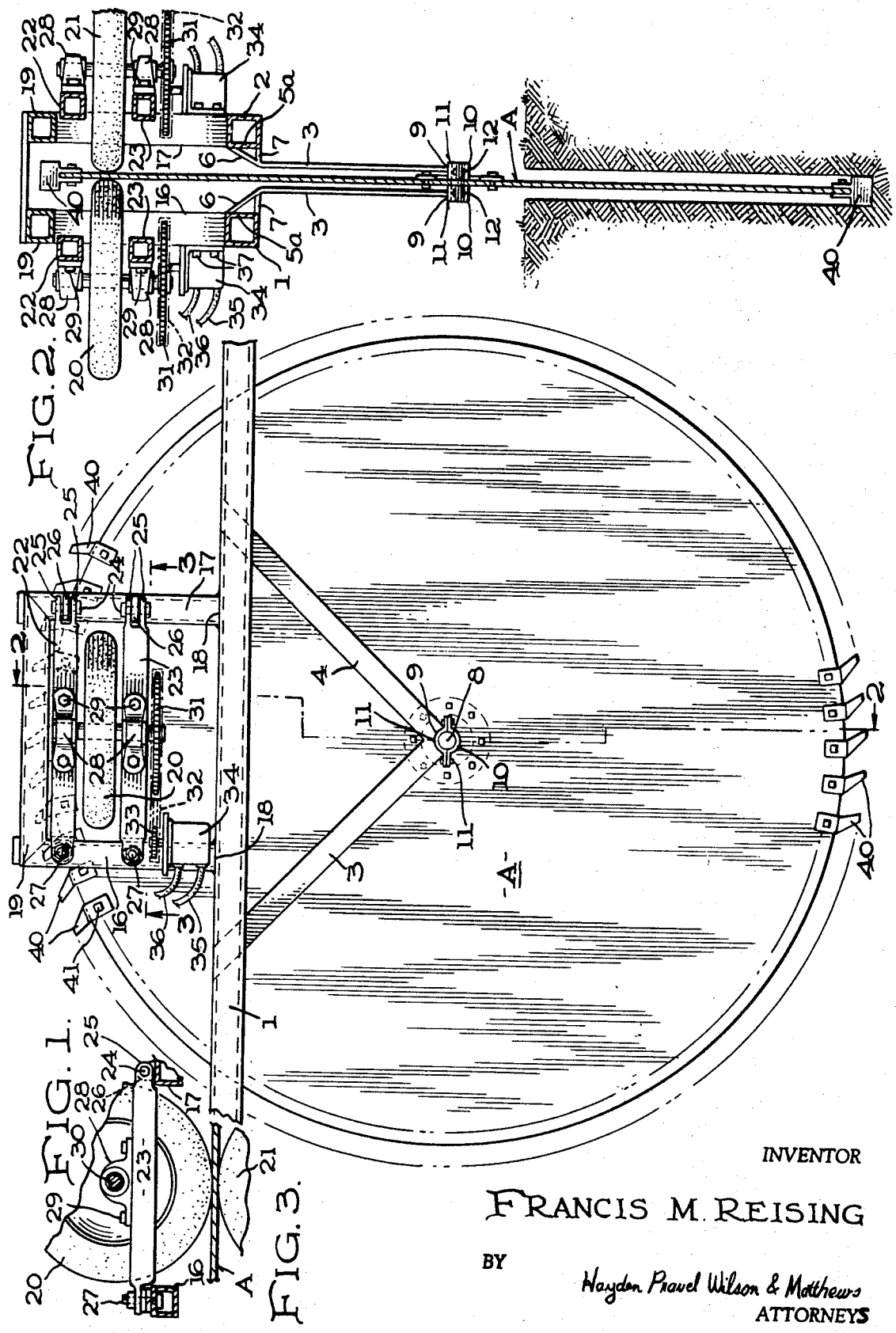

3,524,270
DRIVE MECHANISM FOR DITCHING MACHINE
Francis M. Reising, Pharr, Tex., assignor to R-J Manufacturing Co., Inc., a corporation of Texas
Continuation of application Ser. No. 613,500, Feb. 2, 1967. This application May 1, 1969, Ser. No. 821,556
Int. Cl. E02f 9/20, 5/08; F16h 15/08
U.S. Cl. 37—94        3 Claims

ABSTRACT OF THE DISCLOSURE

A driving mechanism for a ditching machine wherein a ditching wheel is mounted on an axle, and such axle also supports the drive mechanism, including a drive wheel in driving engagement with the ditching wheel, whereby the load of the drive mechanism is carried by the ditching wheel axle and the driving wheel is maintained at a fixed radial distance from the center of the ditching wheel during raising and lowering movements of the ditching wheel.

CROSS-REFERENCE TO RELATED APPLICATION

This application is a continuation of co-pending U.S. patent application Ser. No. 613,500, filed Feb. 2, 1967, now abandoned.

BACKGROUND OF THE INVENTION

The field of this invention is driving mechanisms for ditching apparatus.

Heretofore, the accepted practice for driving mechanisms for ditching wheels has been a gear drive such as shown in U.S. Pat. 1,577,994, wherein the ditching wheel has been driven through a remote power source and an extended gear assembly, which structure limits the area and depth of digging by the ditching wheel due to the pivotal movement of the ditching wheel and the necessity for maintaining the gear drive connection at all times.

Pneumatic tires have been used for frictionally driving disks or wheels such as shown in U.S. Pat. No. 1,649,611, but such drive mechanisms have not heretofore been suitable for driving a ditching wheel. With such prior art drive mechanisms, the driving wheels have been supported separately from the driven disk or wheel so that it was impossible to move the driven disk or wheel downwardly or upwardly without either losing the driving engagement or changing the speed of the driven wheel due to the driving wheel being at a variable radial distance from the center of the driven wheel during such raising and/or lowering of the driven wheel relative to the driving wheel.

SUMMARY OF THE INVENTION

The present invention provides a drive mechanism which overcomes the problems of the prior art and makes it possible to drive a ditching wheel as it is moved upwardly and downwardly, while maintaining driving engagement therewith at all times, and while maintaining the driving wheel at a predetermined radial distance from the center of the ditching wheel for preventing an inadvertent change in the speed of the driven ditching wheel during the raising and/or lowering thereof.

One object of this invention is to provide a drive means for a ditching wheel of that type utilized in cutting narrow trenches through all types of soil formations to provide for the laying of cables, pipes and the like, and embodies a ditching wheel of sheet steel mounted on suitable bearings and including drive wheels positioned substantially above the ditching wheel bearings and at each side of the ditching wheel in a common plane to apply driving pressure at a point to laterally and resiliently stabilize the wheel structure and the driving forces applied thereto.

These and other objects of the invention will more clearly hereinafter appear by reference to the accompanying drawings forming a part of the specification and wherein like reference characters designate corresponding parts throughout the several views.

BRIEF DESCRIPTION OF THE DRAWING

FIG. 1 is a side elevation of the ditching wheel assembly;

FIG. 2 is a transverse vertical section taken on line 2—2 of FIG. 1; and

FIG. 3 is a section taken on line 3—3 of FIG. 1.

DESCRIPTION OF THE PREFERRED EMBODIMENT

In the drawings a pair of elongated, spaced box girders 1 and 2 are illustrated as lying in a horizontal plane, these girders being normally supported from propelled power equipment in a manner to provide for lowering and raising of the girders and the ditching wheel A, as is conventional in the art. Depending from each of the girders is a pair of supporting side plates 3 and 4 connected at their upper ends at spaced points to the inner walls 5ᵃ of the girders by outwardly extending angular projections 6 and 7. The plates 3 and 4 are arranged diagonally and converge to a point 8 approximating the axis mounting of the ditching wheel A. The converging side plates 3 and 4 each support an upper bearing plate 9 which is associated with a lower bearing plate 10 which house the axle assembly 11 upon which the ditching wheel is mounted. Bolts 12 clamp the adjacent flanges of the upper and lower bearing plates 9 and 10 to secure the parts together.

Mounted on the top of each of the girders 1 and 2 are supporting frames each including spaced uprights 16 and 17 welded at their bases 18 to the top walls of the box girders 1 and 2. The upper end portions of the uprights 16 and 17 are connected by the horizontal braces 19 thus providing with the girders 1 and 2 rectangular supporting frames. A pair of driving wheels or tires 20 and 21, preferably pneumatic, are mounted for driving association with the ditching wheel A on each of the supporting frames and are so mounted that their driving pressure can be regulated to apply uniform, similar driving pressures to each side of the ditching wheel to maintain the same against lateral distortion and to stabilize its operation. The mounting means for each of the wheels 20 and 21 on its respective supporting frame comprises spaced tubular arm members 22 and 23, these tubular arm members being hinged to each upright 17 by the hinge pins 24 extending through the spaced terminals 25 provided with openings registering with the openings in outwardly projecting lugs 26 welded to the upright 17. The tubular members 22 and 23 are free to swing on the hinge pins 24 and their opposite ends are clamped to the companion upright 16 by pressure bolts 27, more clearly shown in FIG. 3.

Suitable aligned pillow block bearings 28 are mounted on the tubular members 22 and 23 by bolts 29 for supporting the vertical shafts 30 upon which the pneumatic tires are mounted. The shafts 30 may project either below or above the supporting structure and each shaft 30 has mounted at its projecting end a sprocket wheel 31 driven by a sprocket chain indicated in dotted lines at 32 which is driven from sprocket 33 by the fluid motor 34 which is supplied with hydraulic fluid through a flexible pipe 35, which fluid may exhaust through a similar pipe indicated at 36. The fluid motors 34 are mounted by suitable brackets and bolts 37 on their respective frames. The frame structure, driving wheel or tire, mounting structure and drive means supported on each of the girders at each side of the ditching wheel are identical and the mountings for the tires permit the adjustment of the pressure of the tires against the opposite sides of the ditching wheel to obtain proper driving forces to insure uniform operation of the assembly.

About the periphery of the ditching wheel A is provided a multiplicity of spaced cutting teeth 40, removably secured by bolts 41 so that various types of teeth or new teeth can be substituted as may be required by the nature of the cutting operation or the type of ditch or the width of ditch to be formed by the ditching wheel.

By means of the invention heretofore described, a positive drive is provided for the ditching wheel at a point above the axis of the wheel, the driving pneumatic tires stabilizing the body of the sheet steel ditching wheel and at the same time applying necessary driving pressure by adjustment of the pneumatic tire mountings on the girders, or by modifying the inflation of the tires to obtain an accurate and proper driving pressure. By having the supporting girders 1 and 2 adjustably mounted on an appropriate powered vehicle, the depth and nature of the cut can be accurately determined.

The foregoing disclosure and description of the invention are illustrative and explanatory thereof, and various changes in the size, shape, and materials as well as in the details of the illustrated construction may be made without departing from the spirit of the invention.

I claim:

1. In a ditching machine the improvement residing in: a movable supporting frame including a pair of spaced girders, supporting plates connected to said girders and converging to provide bearing supports at their intersections, a mounting in said bearing supports including an axle, a ditching wheel positioned between said supporting plates and mounted on said axle and extending above said girders, a tire mounted in a frame on each of said girders, said tires being arranged with their axes substantially normal to the axis of said ditching wheel, means for driving said tires, means for adjusting said tires for frictional driving association with each side of said ditching wheel, and a source of power for said means for driving said tires for rotating said ditching wheel, the frames mounting the tires comprising spaced uprights fixed at their lower ends to the spaced girders and connected at their upper ends by a cross member, the frames supporting a pair of spaced arms each hinged at one end to one of the uprights and adjustably secured at the opposite end to the other upright, the tires being mounted in aligned bearings on said hinged arms.

2. In a ditching machine, the improvement residing in the drive mechanism therefor, including:
   (a) a ditching wheel adapted to dig a ditch;
   (b) an axle for rotatably supporting said ditching wheel for rotation thereon;
   (c) a drive mechanism supporting frame;
   (d) a first drive wheel mounted on a shaft for rotation thereon;
   (e) said drive wheel having an annular surface adapted to frictionally engage a side of said ditching wheel;
   (f) means mounting said shaft for said drive wheel on said supporting frame in substantially vertical alignment with and above said axle for rotation of said drive wheel relative to said ditching wheel and in frictional driving engagement therewith;
   (g) power means operably connected to said drive wheel for rotating same for thereby driving said ditching wheel by the frictional engagement with said drive wheel;
   (h) said supporting frame including a pair of uprights on one side of said ditching wheel and disposed substantially parallel to the side of said ditching wheel with one of said uprights being on each side of said shaft;
   (i) said means mounting said shaft for said drive wheel including arm means hinged to one of said uprights; and
   (j) adjustable means securing said arm means to the other of said uprights for maintaining a predetermined pressure of said drive wheel on said ditching wheel.

3. The structure set forth in claim 2 including:
   (a) a second drive wheel disposed on the opposite side of said ditching wheel from said first drive wheel;
   (b) said second drive wheel having an annular surface adapted to frictionally engage the opposite side of said ditching wheel; and
   (c) said supporting frame also supporting said second drive wheel above said axle.

References Cited

UNITED STATES PATENTS

| | | | |
|---|---|---|---|
| 298,353 | 5/1884 | Crump et al. | 299—39 |
| 1,395,100 | 10/1921 | Fite | 143—44 |
| 1,649,611 | 11/1927 | McPherson. | |
| 2,241,383 | 5/1941 | Barnett | 37—94 |
| 2,572,065 | 10/1951 | Smith | 143—44 |

FOREIGN PATENTS 1,188,846  8/1919  Great Britain.

ROBERT E. PULFREY, Primary Examiner

C. D. CROWDER, Assistant Examiner

U.S. Cl. X.R.

143—44; 74—194; 37—189; 299—39